(12) United States Patent
Deng et al.

(10) Patent No.: US 11,960,258 B2
(45) Date of Patent: Apr. 16, 2024

(54) METHOD FOR CONTROLLING SMART PLUG OF HOME SYSTEM, SMART PLUG, AND HOME SYSTEM

(71) Applicants: QINGDAO HAIER WASHING MACHINE CO., LTD., Qingdao (CN); Haier Smart Home Co., Ltd., Qingdao (CN)

(72) Inventors: Jinzhu Deng, Qingdao (CN); Sheng Xu, Qingdao (CN); Peishi Lv, Qingdao (CN); Zhiqiang Zhao, Qingdao (CN)

(73) Assignees: QINGDAO HAIER WASHING MACHINE CO., LTD., Qingdao (CN); Haier Smart Home Co., Ltd., Qingdao (CN)

( * ) Notice: Subject to any disclaimer, the term of this patent is extended or adjusted under 35 U.S.C. 154(b) by 121 days.

(21) Appl. No.: 17/431,236

(22) PCT Filed: Feb. 5, 2020

(86) PCT No.: PCT/CN2020/074352
§ 371 (c)(1),
(2) Date: Aug. 16, 2021

(87) PCT Pub. No.: WO2020/168914
PCT Pub. Date: Aug. 27, 2020

(65) Prior Publication Data
US 2022/0137571 A1    May 5, 2022

(30) Foreign Application Priority Data
Feb. 20, 2019    (CN) .......................... 201910127402.0

(51) Int. Cl.
G05B 15/02    (2006.01)
(52) U.S. Cl.
CPC .................................. G05B 15/02 (2013.01)

(58) Field of Classification Search
CPC ............ G05B 15/02; G05B 2219/2639; G05B 2219/2642; G05B 19/042; G05B 19/418; H02J 3/14
See application file for complete search history.

(56) References Cited

U.S. PATENT DOCUMENTS

| 7,155,305 | B2 * | 12/2006 | Hayes | .................. | H04L 12/281 |
| | | | | | 340/447 |
| 2011/0196547 | A1 * | 8/2011 | Park | ......................... | H02J 3/14 |
| | | | | | 700/296 |

(Continued)

FOREIGN PATENT DOCUMENTS

| CN | 201663443 U | 12/2010 |
| CN | 105242565 A | 1/2016 |

(Continued)

OTHER PUBLICATIONS

International Search Report dated Apr. 28, 2020 in corresponding International application No. PCT/CN2020/074352; 4 pages.

*Primary Examiner* — Alicia M. Choi
(74) *Attorney, Agent, or Firm* — Maier & Maier, PLLC (57) ABSTRACT

A method for controlling a smart plug of a home system, a smart plug, and a home system. The method includes acquiring conditions of currently running household appliances accessing sockets and setting the priority sequence of the currently running household appliances according to the conditions of the currently running household appliances accessing the sockets. Household appliances accessing different sockets of a smart plug can have a priority sequence, and therefore, a user can rank the priorities of a plurality of household appliances by means of the smart plug and can flexibly adjust the priority sequence according to usage habits, thereby not only facilitating integrated management of usage conditions, power consumption conditions and running states of the plurality of household appliances, but (Continued)

also ensuring the flexibility of setting the priority sequence, such that the entire running condition of a home system is more adapted to real-time usage requirements of the user.

11 Claims, 2 Drawing Sheets

(56) References Cited

U.S. PATENT DOCUMENTS

| | | | | |
|---|---|---|---|---|
| 2012/0150359 | A1* | 6/2012 | Westergaard | G05F 1/66 700/291 |
| 2013/0262197 | A1* | 10/2013 | Kaulgud | H02J 3/001 705/14.1 |
| 2015/0066231 | A1* | 3/2015 | Clifton | H02J 3/381 307/46 |
| 2015/0253364 | A1* | 9/2015 | Hieda | H04Q 9/00 702/62 |
| 2015/0331396 | A1* | 11/2015 | Sami | G05B 15/02 700/275 |
| 2015/0370272 | A1* | 12/2015 | Reddy | G05B 17/02 700/278 |
| 2016/0218509 | A1* | 7/2016 | Paul | H02J 3/14 |
| 2016/0286607 | A1* | 9/2016 | Mishra | G08B 25/009 |

FOREIGN PATENT DOCUMENTS

| | | |
|---|---|---|
| CN | 108363343 A | 8/2018 |
| JP | 2008099448 A | 4/2008 |
| JP | 5247850 B2 | 7/2013 |
| JP | 5699104 B2 | 4/2015 |
| KR | 20160100565 A | 8/2016 |

* cited by examiner

METHOD FOR CONTROLLING SMART PLUG OF HOME SYSTEM, SMART PLUG, AND HOME SYSTEM

FIELD

The invention belongs to the field of home systems, and particularly relates to a method for controlling a smart plug of a home system, a smart plug, and a home system.

BACKGROUND

Along with the improvement of people's living standards, the household appliances in users' families are richer and richer in variety. A plurality of different household appliances such as clothes treatment household appliances (such as washing machines, shoe washing machines, smart wardrobes, ironing machines, and the like), environmental conditioning household appliances (air conditioners, humidifiers, air purifiers and the like), leisure and entertainment household appliances (such as televisions, projectors, sound equipment and the like) and the like can be arranged in many users' homes. In daily life, since the usage requirements for the household appliances of the user are flexible and changeable, the number, the running state, and the type of the household appliances which need to be run at the same time in each time period in users' homes can be changed at variable intervals such that the user needs to estimate whether a plurality of household appliances currently running is reasonably run at the same time and whether the running state of each household appliance needs to be changed each time the household appliance is started, thereby lowering the usage experience of the user.

At present, the above problems can be solved by adding all household appliances in a user's home to a smart home system. However, the existing home system usually requires the user to set the priority sequence of each household appliance in advance. When the number and type of household appliances in a user's home change frequently, the user needs to update the set priority sequence frequently. Moreover, when the use tendency of the user is suddenly changed or temporarily changed, all the set priority sequences may be difficult to meet the current usage requirements of the user, and a flexible overall planning according to the real-time use requirements of the user is difficult when the household appliances are coordinated to run.

Accordingly, there is a need in the art for a new method for controlling a smart plug of a home system, a smart plug, and a home system to solve the above-mentioned problems.

SUMMARY

In order to solve the above-mentioned problems in the prior art, namely to solve the problems that the existing home system has poor flexibility in a manner of presetting the priority sequence of each household appliance and cannot meet the real-time usage requirements of a user, the invention provides a method for controlling a smart plug of a home system. The home system includes a smart plug and a plurality of household appliances. The smart plug has a plurality of sockets with different priorities, and each of the sockets can access one household appliance and supply power to the household appliance. the control method includes: acquiring conditions of all currently running household appliances accessing the sockets; and setting a priority sequence of all the currently running household appliances according to the conditions of all the currently running household appliances accessing the sockets.

According to the preferred technical solution of the control method, after the step of "setting priority sequence of all the currently running household appliances", the control method further includes: judging whether a household appliance to be run is accessed into the socket; and selectively adjusting the running state of some of or all of the currently running household appliances if the household appliance to be run is accessed into the socket.

According to the preferred technical solution of the control method, the step of "selectively adjusting the running state of some of or all of the currently running household appliances" includes: acquiring the condition of the socket which the household appliance to be run is prepared to access; determining a priority of the household appliance to be run according to the acquired condition of the household appliance to be run accessing the socket; determining a position of the priority of the household appliance to be run in the priority sequence; and selectively adjusting the running state of the currently running household appliance according to the position of the priority of the household appliance to be run in the priority sequence.

According to the preferred technical solution of the control method, the step of "selectively adjusting the running state of the currently running household appliance according to the position of the priority of the household appliance to be run in the priority sequence" includes the following steps: when the priority of the household appliance to be run is at the highest level, adjusting the running state of the currently running household appliance according to the priority sequence.

According to the preferred technical solution of the control method, the control method further includes, at the same time as or after the step of "adjusting the running state of the currently running household appliance according to the priority sequence": acquiring a current power margin; acquiring a maximum power of the household appliance to be run; comparing the current power margin with the maximum power; and if the current power margin is greater than the maximum power of the household appliance to be run, allowing the socket into which the household appliance to be run is accessed to supply power to the household appliance to be run.

According to the preferred technical solution of the control method, the step of "selectively adjusting the running state of the currently running household appliance according to the position of the priority of the household appliance to be run in the priority sequence" includes the following steps: when the priority of the household appliance to be run is at a middle level, adjusting the running state of the currently running household appliance with a priority lower than that of the household appliance to be run according to the priority sequence.

According to the preferred technical solution of the control method, the control method further includes, at the same time as or after the step of "adjusting the running state of the currently running household appliance with a priority lower than that of the household appliance to be run according to the priority sequence": acquiring a current power margin; acquiring a maximum power of the household appliance to be run; comparing the current power margin with the maximum power; and if the current power margin is greater than the maximum power of the household appliance to be run, allowing the socket into which the household appliance to be run is accessed to supply power to the household appliance to be run.

According to the preferred technical solution of the control method, the step of "selectively adjusting the running state of the currently running household appliance according to the position of the priority of the household appliance to be run in the priority sequence" includes the following steps: when the priority of the household appliance to be run is at the lowest level, not adjusting the running states of all the currently running household appliances.

According to the preferred technical solution of the control method, the control method further includes, at the same time as or after the step of "not adjusting the running states of all the currently running household appliances": judging whether the household appliance to be run has a low-power running mode or not; and if the household appliance to be run has a low-power running mode, selectively allowing the socket into which the household appliance to be run is accessed to supply power to the household appliance to be run in the low-power running mode.

According to the preferred technical solution of the control method, the step of "selectively allowing the socket into which the household appliance to be run is accessed to supply power to the household appliance to be run in the low-power running mode" includes: acquiring a current power margin; acquiring the minimum power of the household appliance to be run; comparing the current power margin with a minimum power; and if the current power margin is greater than the power of the household appliance to be run in the low-power running mode, allowing the socket into which the household appliance to be run is accessed to supply power to the household appliance to be run in the low-power running mode.

According to the preferred technical solution of the control method, the step of "selectively allowing the socket into which the household appliance to be run is accessed to supply power to the household appliance to be run in the low-power running mode" further includes: if the current power margin is less than or equal to the power of the household appliance to be run in the low-power running mode, refusing the socket into which the household appliance to be run is accessed to supply power to the household appliance to be run.

According to the preferred technical solution of the control method, the step of "selectively adjusting the running states of some of or all of the currently running household appliances if the household appliance to be run is accessed into the socket" includes: acquiring a remaining running duration of each currently running household appliance; acquiring a shortest remaining running duration of all the remaining running durations; comparing the shortest remaining running duration with a preset duration; and selectively adjusting the running state of the currently running household appliance if the shortest remaining running duration is longer than the preset duration.

According to the preferred technical solution of the control method, the step of "acquiring a remaining running duration of each currently running household appliance" includes: acquiring a current power margin; acquiring a maximum power of the household appliance to be run; comparing the current power margin with the maximum power; and if the current power margin is less than or equal to the maximum power, acquiring the remaining running duration of each currently running household appliance.

According to the preferred technical solution of the control method, the step of "selectively adjusting the running states of some of or all of the currently running household appliances if the household appliance to be run is accessed into the socket" further includes: if the shortest remaining running duration is less than or equal to the preset duration, refusing the socket into which the household appliance to be run is accessed to supply power to the household appliance to be run.

The invention also provides a smart plug. The smart plug has a plurality of sockets with different priorities, and each of the sockets can access one household appliance and supply power to the household appliance.

In addition, the invention also provides a home system, including a smart plug and a plurality of household appliances, wherein the smart plug is the above-mentioned smart plug.

It can be understood by those skilled in the art that in the preferred technical solution of the present invention, the smart plug has a plurality of sockets with different priorities, so that the household appliances accessed to different sockets can have a priority sequence, thereby enabling a user to flexibly adjust the priority sequence of the household appliances according to usage habits. This not only realizes the overall management of a plurality of household appliances, but also is beneficial to comprehensively manage the usage conditions, power consumption conditions, running states, and the like of the plurality of household appliances. And moreover, the sequence flexibility of coordinated management is guaranteed, so that the overall running condition of the home system can adapt to the real-time usage requirements of the user, and the user experience is greatly improved.

Furthermore, after the priority sequence of all the currently running household appliances is set, in the situation that the socket into which the household appliance to be run is accessed needs to supply power to the household appliance to be run, the running states of some of or all of the currently running household appliances can be selectively adjusted according to the priority sequence so that the running states of the currently running household appliances which the user needs to run more can be guaranteed, and the currently running household appliances which the user wants to run is prevented from being influenced because other household appliances join the running queue.

Furthermore, after acquiring the priority of the household appliance to be run, the running states of some of or all of the currently running appliances can be selectively adjusted according to the position of the household appliance to be run in the set priority sequence so as to compare the priorities of the household appliance to be run and all the household appliances currently running, thereby determining the running necessity of the household appliance to be run. Therefore, the household appliance with an adjustable running state in the currently running household appliances is determined, so that the household appliances which can be finally in the running queue are all household appliances that are more expected to run by a user.

Furthermore, in the situation that the running states of the household appliances are selectively adjusted according to the priority sequence, the socket into which the household appliance to be run is accessed is selectively allowed to supply power to the household appliance to be run through the comparison result of the current power margin and the maximum power of the household appliance to be run, so that it is guaranteed that the limited total power of the house is not exceeded even if new household appliances are added into the running queue, and the power utilization safety is guaranteed.

In addition, the invention also provides a smart plug. Through the smart plug, the block management of all household appliances in a user's home can be realized, so that a plurality of household appliances that are distributed in a concentrated mode can realize systematic and coordinated running only by being linked to the smart plug. As such, the safety of the simultaneous running of a plurality of household appliances is guaranteed, and the setting flexibility of coordinating the priority sequence of a plurality of household appliances is improved. The coordinating rule of a plurality of household appliances can more adapt to the usage requirements of a user, and the user experience is excellent.

Further, the invention also provides a home system. Since the home system includes the smart plug and a plurality of household appliances, the home system has the technical effect of the smart plug. Compared with the existing home system which directly sets the priority sequence of the household appliances, the home system of the invention can coordinate the overall running state according to the priority sequence expected by the user in the situation of ensuring that a plurality of household appliances in the user's home run safely at the same time without needing the user to change or increase the priority presetting condition frequently. The home system is more convenient to use and more suitable for the periodic usage requirements of the user.

Scheme 1: a method for controlling a smart plug of a home system, characterized in that the home system comprises a smart plug and a plurality of household appliances, wherein the smart plug has a plurality of sockets with different priorities, and each of the sockets can access one household appliance and supply power to the household appliance; the control method includes: acquiring conditions of all currently running household appliances accessing the sockets; and setting priority sequence of all the currently running household appliances according to the conditions of all the currently running household appliances accessing the sockets.

Scheme 2: the control method according to scheme 1, characterized in that after a step of "setting priority sequence of all the currently running household appliances", the control method further comprises: judging whether a household appliance to be run is accessed into the socket; and selectively adjusting a running state of the currently running household appliance if the household appliance to be run is accessed into the socket.

Scheme 3: the control method according to scheme 2, characterized in that the step of "selectively adjusting a running state of the currently running household appliance" comprises: acquiring conditions of the household appliance to be run accessing the socket; determining a priority of the household appliance to be run according to the acquired condition of the household appliance to be run accessing the socket; determining a position of the priority of the household appliance to be run in the priority sequence; and selectively adjusting the running state of the currently running household appliance according to the position of the priority of the household appliance to be run in the priority sequence.

Scheme 4: the control method according to scheme 3, characterized in that a step of "selectively adjusting the running state of the currently running household appliance according to the position of the priority of the household appliance to be run in the priority sequence" comprises: when the priority of the household appliance to be run is at the highest level, adjusting the running state of the currently running household appliance according to the priority sequence.

Scheme 5: the control method according to scheme 4, characterized in that the control method further comprises, at the same time as or after the step of "adjusting the running state of the currently running household appliance according to the priority sequence": acquiring a current power margin; acquiring a maximum power of the household appliance to be run; comparing the current power margin with the maximum power; and if the current power margin is greater than the maximum power, allowing the socket into which the household appliance to be run is accessed to supply power to the household appliance to be run.

Scheme 6: the control method according to scheme 3, characterized in that a step of "selectively adjusting the running state of the currently running household appliance according to the position of the priority of the household appliance to be run in the priority sequence" comprises: when the priority of the household appliance to be run is at a middle level, adjusting the running state of the currently running household appliance with a priority lower than that of the household appliance to be run according to the priority sequence.

Scheme 7: the control method according to scheme 6, characterized in that the control method further comprises, at the same time as or after the step of "adjusting the running state of the currently running household appliance with a priority lower than that of the household appliance to be run according to the priority sequence": acquiring a current power margin; acquiring a maximum power of the household appliance to be run; comparing the current power margin with the maximum power; and if the current power margin is greater than the maximum power, allowing the socket into which the household appliance to be run is accessed to supply power to the household appliance to be run.

Scheme 8: the control method according to scheme 3, characterized in that a step of "selectively adjusting the running state of the currently running household appliance according to the position of the priority of the household appliance to be run in the priority sequence" comprises: when the priority of the household appliance to be run is at the lowest level, not adjusting the running states of all the currently running household appliances.

Scheme 9: the control method according to scheme 8, characterized in that the control method further comprises, at the same time as or after the step of "not adjusting the running states of all the currently running household appliances": judging whether the household appliance to be run has a low-power running mode or not; and if the household appliance to be run has a low-power running mode, selectively allowing the socket into which the household appliance to be run is accessed to supply power to the household appliance to be run in the low-power running mode.

Scheme 10: the control method according to scheme 9, characterized in that the step of "selectively allowing the socket into which the household appliance to be run is accessed to supply power to the household appliance to be run in the low-power running mode" comprises: acquiring a current power margin; acquiring the minimum power of the household appliance to be run; comparing the current power margin with a minimum power; and if the current power margin is greater than the minimum power, allowing the socket into which the household appliance to be run is accessed to supply power to the household appliance to be run in the low-power running mode.

Scheme 11: the control method according to scheme 10, characterized in that the step of "selectively allowing the socket into which the household appliance to be run is accessed to supply power to the household appliance to be run in the low-power running mode" further comprises: if the current power margin is less than or equal to the maximum power, refusing the socket into which the household appliance to be run is accessed to supply power to the household appliance to be run.

Scheme 12: the control method according to scheme 2, characterized in that the step of "selectively adjusting a running state of the currently running household appliance if the household appliance to be run is accessed into the socket" comprises: acquiring a remaining running duration of each currently running household appliance; acquiring a shortest remaining running duration of all the remaining running durations; comparing the shortest remaining running duration with a preset duration; and selectively adjusting the running state of the currently running household appliance if the shortest remaining running duration is longer than the preset duration.

Scheme 13: the control method according to scheme 12, characterized in that the step of "acquiring a remaining running duration of each currently running household appliance" comprises: acquiring a current power margin; acquiring a maximum power of the household appliance to be run; comparing the current power margin with the maximum power; and if the current power margin is less than or equal to the maximum power, acquiring the remaining running duration of each currently running household appliance.

Scheme 14: the control method according to scheme 12, characterized in that the step of "selectively adjusting a running state of the currently running household appliance if the household appliance to be run is accessed into the socket" further comprises: if the shortest remaining running duration is less than or equal to the preset duration, refusing the socket into which the household appliance to be run is accessed to supply power to the household appliance to be run.

Scheme 15: a smart plug, characterized in that the smart plug has a plurality of sockets with different priorities, and each of the sockets can access one household appliance and supply power to the household appliance.

Scheme 16: a home system, characterized by comprising a smart plug and a plurality of household appliances, wherein the smart plug is the smart plug according to scheme 15.

DETAILED DESCRIPTION

Preferred implementation modes of the present invention will now be described with reference to the accompanying drawings. It should be understood by those skilled in the art that these implementation modes are merely illustrative of the technical principles of the present invention and are not intended to limit the scope of the present invention.

It is to be noted that in the description of the present invention, although each step of the control method of the present invention is described in the present application in a particular sequence, these sequences are not limiting and those skilled in the art can perform the steps in a different sequence without departing from the basic principles of the present invention.

Based on the problem pointed out in the background art that the priority sequence of a plurality of household appliances directly set by the user will need to be adjusted due to changes in any of the type, number, and usage requirements of the household appliances, and the flexibility is poor, the invention provides a method for controlling a smart plug of a home system, aiming to coordinate a plurality of household appliances and at the same time ensure the flexibility of a coordination rule (i.e. priority sequence), thereby decreasing the frequency of user setting for updating the priority sequence and improving user experience.

Figure 1:
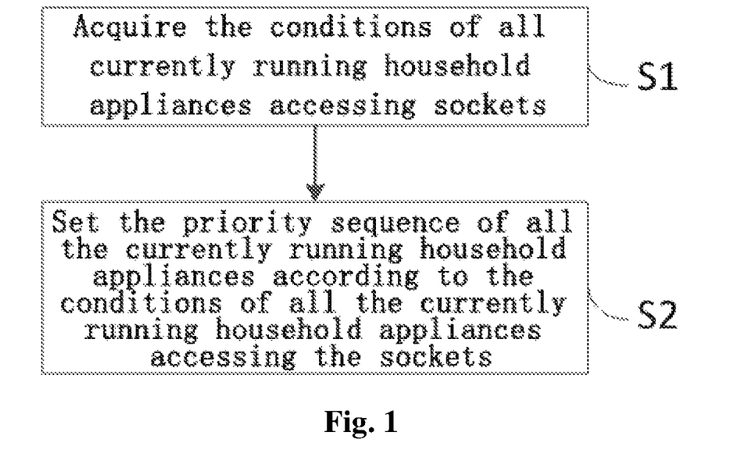
FIG. 1 is a flow chart of main steps of a control method of the present invention.

Specifically, the home system of the present invention includes a smart plug and a plurality of household appliances. The smart plug has a plurality of sockets of different priorities (the present invention only describes the following implementation modes in combination with the situation where there is no socket with the same priority), and each socket is capable of accessing one household appliance and supplying power thereto. As shown in FIG. 1, the method for controlling a smart plug of a home system of the invention includes steps as follows.

Step S1: acquiring the conditions of all currently running household appliances accessing sockets;

In this step, "the conditions of all currently running household appliances accessing sockets" specifically refers to: the positions of the sockets into which each currently running household appliance is specifically accessed when the smart plug is arranged with a plurality of sockets, and two-to-two connection between a plurality of currently running household appliances and a plurality of sockets.

Step S2: setting the priority sequence of all the currently running household appliances according to the conditions of all the currently running household appliances accessing the sockets.

In this step, since the priorities of the sockets into which each household appliance is accessed are different, corresponding to the priority of the sockets specifically corresponding to each household appliance, a plurality of household appliances can be sorted according to the priority of the socket to which they are accessed, that is, the priorities of the sockets determine the priorities of the currently running household appliances accessed to the sockets so that the priority sequence of all the currently running household appliances is set. Among them, the one-to-one correspondence between the sequence of priorities and each currently running household appliance is obviously changeable. The user may adjust the priority sequence by adjusting the correspondence between the sockets and priorities thereof. For example, the user can adjust the priority sequence by changing the socket positions accessed by the household appliances; alternatively, the user may change the priority sequence by directly changing the priority level of each socket. For example, setting a socket with a high priority to the socket with a high priority, setting a socket with a low priority to the socket with a medium priority, and setting a socket with a medium priority to the socket with a low priority. The priority sequence can be adjusted in a manner of either equipment/program setting or manual setting.

Preferably, after step S2, the control method of the present invention further includes:

judging whether a household appliance to be run is accessed into the socket;

and selectively adjusting the running state of the currently running household appliance if the household appliance to be run is accessed into the socket.

In the implementation mode, the "access" in "a household appliance to be run is accessed into a socket" specifically refers to the fact that: the smart plug supplies power to the household appliance to be run through the socket into which the household appliance to be run is accessed, namely, the household appliance to be run is inserted into the socket and obtains electric energy from the socket. That is, the household appliance to be run can also be inserted only into the socket, and the socket does not supply power to the household appliance to be run. When the household appliance to be run need to obtain electric energy from the socket, the control method of the invention can coordinate the state between the household appliance in the running queue and the household appliance which wants to join the running queue by adjusting the running state of the currently running household appliance, so as to ensure that all the household appliances in the subsequent running queue can run in the preferred running manner. Of course, in some set situations, such as a situation where household appliances in a subsequent running queue (including newly joined household appliances to be run) can run well after the household appliance to be run join the running queue, or a situation where the running state of all household appliances (not including household appliances to be run wanting to join the queue) in the currently running queue is preferably unchanged. It is also possible not to adjust the running state of the currently running household appliances.

If the household appliance to be run does not need a socket to supply power thereto:
in one possible situation, it is possible to not continue to perform any step until a user actively initiates the judgment step and directly defaults the judgment result to the fact that the household appliance to be run which needs to be accessed into the socket exists;
in another possible situation, it is also possible to continuously repeat the judgment step, or perform the judgment step again after a preset time until the household appliance to be run which needs to be powered by a socket is detected;
in yet another possible situation, it is also possible to infer that there may be a time period in which a household appliance to be run needs a socket to supply power thereto according to a household appliance usage habit of a user within a history time, and the judgement step is executed within the time period.

In summary, in the situation where it is judged that there is no household appliance to be run which needs a socket to supply power thereto, whether the execution program terminates, pauses, or cyclically executes the run steps or the like can be set according to the specific usage requirements in the actual application scene.

The control method of the present invention is further described with reference to the above implementation mode.

When a household appliance to be run needs an accessed socket to supply power thereto:
in a preferred implementation mode of the present invention, the above-mentioned step of "selectively adjusting the running state of the currently running household appliance if the household appliance to be run is accessed into the socket" specifically includes:
acquiring the remaining running duration of each currently running household appliance;
acquiring the shortest remaining running duration of all the remaining running durations;
comparing the shortest remaining running duration with a preset duration;
and selectively adjusting the running state of the currently running household appliance if the shortest remaining running duration is longer than a preset duration.

In the above-mentioned implementation mode, the "remaining running duration" of each currently running household appliance refers to the remaining execution time of the entire running program of the currently running household appliance in the running state, i.e., how long the currently running household appliance needs to run before ending the running program and stopping the running (shutdown or standby). By selecting the currently running household appliance with the shortest remaining running duration, it can be judged whether there is a household appliance about to end the running mode so that it is determined that whether the number of the household appliances in the running state in the main circuit (i.e. all the power supply circuits accessed with the same plug) in the user's home will change quickly or not. Therefore, according to the specific changing condition, the specific power connection environment of the household appliance to be run is judged, and the running state of the currently running household appliance is selectively adjusted. The preset duration is set so that the current circuit environment can be judged within a fixed specific time period each time, and whether the number changing condition of the currently running household appliances is stable or not is judged according to the set duration. When the selected shortest running duration is longer than the preset duration, it indicates that the number of the household appliances running in the current circuit environment will not change greatly within the set time, and the step of selectively adjusting the running state of the household appliances currently running can be continued. Otherwise, the step of selectively adjusting the running state of the household appliances currently running is not performed.

In one possible situation, when the shortest remaining running duration is less than or equal to the preset duration, it indicates that there is a household appliance about to end the running program in the running household appliances. After the household appliance ends the running program, the circuit environment with the reduced number of the currently running household appliances can provide a good running environment for the household appliance to be run and does not influence all household appliances still in the running state. At the moment, other steps do not need to be performed as it carries on. The socket into which the household appliance to be run is accessed can be enabled to supply power for the household appliance to be run as long as it waits until the running duration of the currently running household appliance about to end running ends. In this situation, the socket into which the household appliance to be run is accessed can be refused to supply power to the household appliance to be run such that after the circuit environment is changed, whether the socket into which the household appliance to be run is accessed can supply power to the household appliance to be run is specifically judged. For example, when it is judged that the shortest remaining running duration is less than or equal to the preset duration, the socket into which the household appliance to be run is accessed is refused to supply power to the household appliance to be run. After the shortest remaining duration ends, it is judged that the socket into which the household appliance to be run is accessed supplies power to the household appliance to be run. If yes, power is supplied, and otherwise, the step of selectively adjusting the running state of the currently running household appliance is performed. The specific value of the preset duration can be set according to the actual usage requirements.

Further, since there may be a situation where the number of currently running household appliances inserted into the same smart plug is small or most of the currently running household appliances are low-power household appliances or most of the currently running household appliances are low in running power, it is preferable that the step of "acquiring the remaining running duration of each currently running household appliance" includes:

acquiring a current power margin;

acquiring the maximum power of the household appliance to be run;

comparing the current power margin with the maximum power;

and if the current power margin is less than or equal to the maximum power, acquiring the remaining running duration of each currently running household appliance.

In the implementation mode, "current power margin" refers to the margin of power remaining in the current circuit environment, i.e., the maximum amount of power that can allow the household appliance to be run to occupy. The current power margin is the difference value between the total power defined in the main circuit and the total amount of power occupied by all the currently running household appliances. The total power defined in the main circuit can be flexibly adjusted according to safe usage requirements. For example, the total power can be the actual total power in the home of the user, the maximum power value allowed by the current circuit environment of the user, and any power value set by the user and slightly smaller than the maximum safe total power value. In one possible situation, the interior of the smart plug is arranged with a power adjustment module so that the user can adjust the total power value allowed by the smart plug within a safe range. In particular, the module may be realized by a varistor element or the like. The "maximum power of the household appliance to be run" refers to the maximum power that the household appliance to be run needs to occupy in the overall running progress. When the current power margin is less than or equal to the maximum power, it indicates that the current circuit environment is difficult to meet the running requirement of the household appliance to be run. At this time, the remaining running duration of each currently running household appliance needs to be acquired, and the next program step is performed so as to continuously judge whether the rest of the situations where household appliances to be run can be accessed exist. If the current power margin is less than or equal to the maximum power, it indicates that the current circuit environment can meet the running requirement of the household appliance to be run. At the moment, it is allowed that the socket into which the household appliance to be run is accessed supplies power to the household appliance to be run, and the household appliance to be run is directly enabled to be accessed into the circuit to start running.

Of course, the above-mentioned procedure about judging the circuit environment by acquiring the remaining running duration is not necessary. For example, in the situation where it is judged that the current power margin is less than or equal to the maximum power, it is also possible to directly and selectively adjust the running state of the currently running household appliance. Furthermore, although the electrical parameters used in the above-mentioned judging procedure are described in connection with power, this is not limiting and, in fact, the above-mentioned judging steps can also be executed in connection with the rest of the electrical parameters, such as current/voltage, which can be indirectly converted to power.

Preferably, the step of "selectively adjust the running state of the currently running household appliance" includes the following substeps:

acquiring the condition of the household appliance to be run accessing the socket;

determining the priority of the household appliance to be run according to the acquired condition of the household appliance to be run accessing the socket;

determining the position of the priority of the household appliance to be run in the priority sequence of all the currently running household appliances;

and selectively adjusting the running state of the currently running household appliance according to the position of the priority of the household appliance to be run in the priority sequence of all the currently running household appliances.

Among them, "the condition of the household appliance to be run accessing the socket" refers to the specific socket position into which the household appliance to be run needs to be accessed. After the priority sequence corresponding to the specific socket is acquired, the high-low relationship between the priority of the household appliance to be run and the priority of the rest currently running household appliances can be obtained by comparing the priority with all the priorities in the priority sequence, so that the running state of the currently running household appliance is selectively adjusted according to the high-low priority sequence of the household appliance to be run and all the currently running household appliances.

Furthermore, in one possible implementation mode, the step of "selectively adjusting the running state of the currently running household appliance according to the position of the priority of the household appliance to be run in the priority sequence" includes the following steps:

when the priority of the household appliance to be run is at the highest level, adjusting the running state of the currently running household appliance according to the priority sequence. In the above steps, since the priorities of all the currently running household appliances are lower than the priority of the household appliance to be run, all the currently running household appliances belong to adjustable objects. "Adjusting the running state of the currently running household appliance according to the priority sequence" specifically refers to the case that when the running state of the currently running household appliance is adjusted, the currently running household appliance with low priority is preferentially adjusted. If the circuit environment after the currently running household appliance with low priority is adjusted does not meet the accessing requirement of the household appliance to be run, the currently running household appliance with the next lowest priority level is continuously adjusted until the currently running household appliance with the highest priority is adjusted. As an example, the means for adjusting the currently running household appliance includes at least one of "enabling the currently running household appliance to run in a low mode with a small occupied power", "enabling the currently running household appliance to suspend running a program", "enabling the currently running household appliance to end running a program and be in a standby state", and "enabling the currently running household appliance to be in an off/to be awakened state". When the adjustment manners are plural, the execution sequence of the plurality of adjustment manners can be set according to usage habits, usage requirements, and the like of users. For example, the execution sequence is: switch low power mode>suspend running>standby>off/to be awakened. Of course, the adjustment manner specifically adopted is not limited to the above four types, so long as the power occupation of the main circuit can be reduced on the premise of meeting the usage requirements of users.

Furthermore, the control method of the present invention further includes, at the same time as or after the step of "adjusting the running state of the currently running household appliance according to the priority sequence":
acquiring a current power margin;
acquiring the maximum power of the household appliance to be run;
comparing the current power margin with the maximum power;
and if the current power margin is greater than the maximum power, allowing the socket into which the household appliance to be run is accessed to supply power to the household appliance to be run.

The above-mentioned "current power margin" refers to the power margin in the main circuit after the running state of the currently running household appliance is adjusted. For example, after the running state of the household appliance with the lowest priority is adjusted, the power margin in the main circuit at the moment can be acquired, and whether the household appliance to be run can be accessed into the circuit or not can be judged through the above-mentioned steps. If yes, access is carried out. Otherwise, the household appliance with the next lowest priority is adjusted and the judging procedure is repeated. Of course, although the embodiment is described in connection with adjusting only one currently running household appliance each time, in practice, the number of currently running household appliances adjusted each time is not defined. For example, the currently running household appliances with the lowest priority and next lowest priority can be adjusted at the same time, and if the accessing condition is not met, the currently running household appliances with middle priority and high priority are adjusted.

In another possible implementation mode, the step of "selectively adjusting the running state of the currently running household appliance according to the position of the priority of the household appliance to be run in the priority sequence" includes the following steps:
when the priority of the household appliance to be run is at the middle level, adjusting the running state of the currently running household appliance with a priority lower than that of the household appliance to be run according to the priority sequence.

In the above-mentioned steps, since the priorities of some of all the currently running household appliances are higher than the priority of the household appliance to be run, and the priorities of the others of the household appliances are lower than the priority of the household appliance to be run, in this situation, the object with the adjustable running state is the currently running household appliance with a priority lower than that of the household appliances to be run.

Likewise, the control method of the present invention further includes, at the same time as or after the step of "adjusting the running state of the currently running household appliance with a priority lower than that of the household appliances to be run according to the priority sequence":
acquiring a current power margin;
acquiring the maximum power of the household appliance to be run;
comparing the current power margin with the maximum power;
and if the current power margin is greater than the maximum power, allowing the socket into which the household appliance to be run is accessed to supply power to the household appliance to be run.

Since the judging procedure has been described in the foregoing, it will not be described in detail herein.

In yet another possible implementation mode, the step of "selectively adjusting the running state of the currently running household appliance according to the position of the priority of the household appliance to be run in the priority sequence" includes the following steps:
when the priority of the household appliance to be run is at the lowest level, not adjusting the running states of all the currently running household appliances.

In the above steps, since the priorities of all the currently running household appliances are higher than the priority of the household appliance to be run, in this situation, there is no object whose running state is adjustable among all the currently running household appliances.

Preferably, the control method of the present invention further includes, at the same time as or after the step of "not adjusting the running states of all currently running household appliances":
judging whether the household appliance to be run has a low-power running mode or not;
and if the household appliance to be run has a low-power running mode, selectively allowing the socket into which the household appliance to be run is accessed to supply power to the household appliance to be run in the low-power running mode.

That is to say, in the situation where the running states of all the currently running household appliances are not adjustable, it can be judged whether the to-be-run state of the household appliance to be run is adjustable on the premise of meeting the usage requirements of users, that is, it is judged whether the household appliance to be run can be accessed into the main circuit in a running mode with small occupied power, and the socket into which the household appliance to be run is accessed is allowed or refused to supply power to the household appliance to be run according to the judgment result.

Furthermore, the step of "selectively allowing the socket into which the household appliance to be run is accessed to supply power to the household appliance to be run in the low-power running mode" includes the following steps:
acquiring a current power margin;
acquiring the minimum power of the household appliance to be run;
comparing the current power margin with the minimum power;
and if the current power margin is greater than the minimum power, allowing the socket into which the household appliance to be run is accessed to supply power to the household appliance to be run in the low-power running mode.

In the above-mentioned judging procedure, the "current power margin" means the power margin in the main circuit when the running states of all the currently running household appliances are not adjusted. "Minimum power" refers to the maximum power that can be occupied in the main circuit in the low-power mode in which the household appliance to be run can run. In the situation that the current power margin is greater than the minimum power, the remaining power in the main circuit can allow the household appliance to be run to be accessed so that the socket into which the household appliance to be run is accessed at the time can be allowed to supply power to the household appliance to be run in a low-power mode. Otherwise, the socket into which the household appliance to be run is accessed is refused to supply power to the household appliance to be run.

Since the above-mentioned three implementation modes are described separately in connection with one type of position situation, the control method of the present invention, in practical applications, may include the running procedure of at least one of the above-mentioned three implementation modes. Preferably, the control method of the present invention includes the running steps in the above-mentioned three situations at the same time so as to accurately judge whether the socket into which the household appliance to be run is accessed can supply power to the household appliance to be run for a plurality of possible accessing positions of the household appliance to be run.

Figure 2:
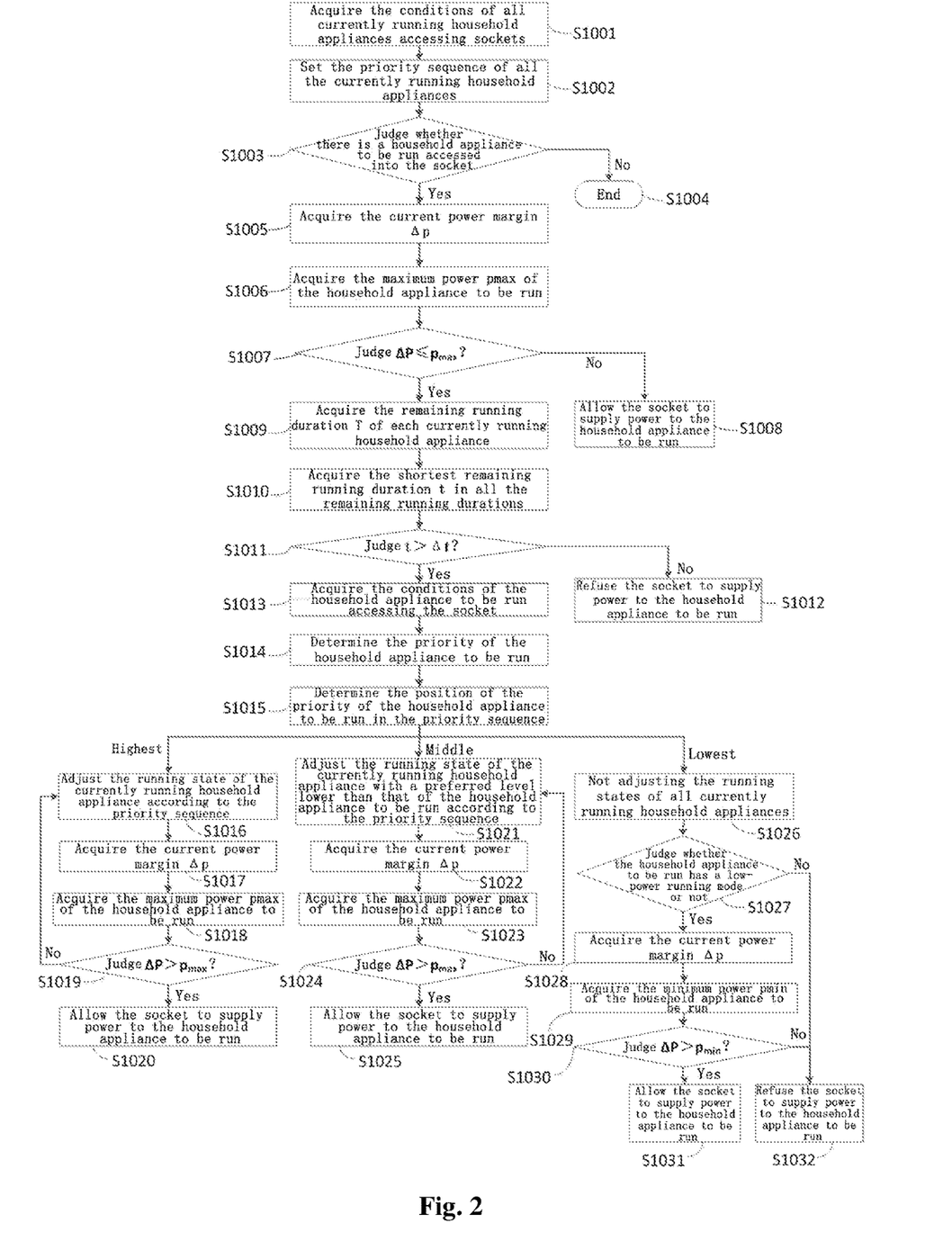
FIG. 2 is a flowchart showing detailed steps of a preferred implementation mode of the control method of the present invention.

As shown in FIG. 2, the detailed steps of the preferred implementation mode of the control method of the present invention include:
- step S1001: acquiring the conditions of all currently running household appliances accessing sockets;
- step S1002: setting the priority sequence of all the currently running household appliances;
- step S1003: judging whether there is a household appliance to be run accessed into the socket;
- if there is no household appliance to be run which needs a socket to supply power, executing step S1004 of ending the program; and if there is a household appliance to be run which needs a socket to supply power, executing step S1005.

In the situation where there is no household appliance to be run which needs a socket to supply power:
- step S1004: end the program.

In the situation where there is a household appliance to be run which needs a socket to supply power, the following steps are carried out:
- step S1005: acquiring a current power margin $\Delta p$ in the main circuit;
- step S1006: acquiring the maximum power $p_{max}$ of the household appliance to be run;
- and step S1007: judging whether the current power margin $\Delta p$ is less than or equal to the maximum power $p_{max}$ of the household appliance to be run, if the current power margin $\Delta p$ is less than or equal to the maximum power $p_{max}$ of the household appliance to be run, executing step S1009, otherwise, executing step S1008.

In the situation where the current power margin $\Delta p$ is greater than the maximum power $p_{max}$ of the household appliance to be run, the following step is carried out:
- step S1008: allowing the socket into which the household appliance to be run is accessed to supply power to the household appliance to be run, and ending the program.

In the situation where the current power margin $\Delta p$ is less than or equal to the maximum power $p_{max}$ of the household appliance to be run, the following steps are carried out:
- step S1009: acquiring the remaining running duration $T(T_1, T_2 \ldots T_n)$ of all currently running household appliances;
- step S1010: acquiring the shortest remaining duration t of all the remaining running durations $T_1, T_2 \ldots T_n$;
- step S1011: judging whether the shortest remaining duration t is greater than a set duration $\Delta t$;
- and if the shortest remaining duration t is less than or equal to the set duration $\Delta t$, executing step S1012, otherwise, executing step S1013;

In the situation where the shortest remaining duration t is less than or equal to the set duration $\Delta t$:
- step S1012: refusing the socket into which the household appliance to be run is accessed to supply power to the household appliance to be run.

In the situation where the shortest remaining duration t is greater than the set duration $\Delta t$:
- step S1013: acquiring the condition of the household appliance to be run accessing the socket;
- step S1014: determining the priority of the household appliance to be run according to the condition of the household appliance to be run accessing the socket;
- step S1015: determining the position of the priority of the household appliance to be run in the priority sequence;
- if the priority of the household appliance to be run is at the highest level, executing step S1016; if the priority of the household appliance to be run is at the middle level, executing step S1021; and if the priority of the household appliance to be run is at the lowest level, executing step S1026.

In the situation where the priority of the household appliance to be run is at the highest level, the following steps are carried out:
- step S1016: adjusting the current running state according to the priority sequence and executing step S1027;
- step S1017: acquiring a current power margin $\Delta p$ in an adjusted main circuit;
- step S1018: acquiring the maximum power $p_{max}$ of the household appliance to be run;
- step S1019: judging whether the current power margin $\Delta p$ is greater than the maximum power $p_{max}$, and if the current power margin $\Delta p$ is greater than the maximum power $p_{max}$, executing step S1020, and otherwise, returning to step S1016;
- and step S1020: allowing the socket into which the household appliance to be run is accessed to supply power to the household appliance to be run.

In the situation where the priority of the household appliance to be run is at a middle level, the following steps are carried out:
- step S1021: adjusting the running state of the currently running household appliance with a priority lower than that of the household appliance to be run according to the priority sequence and executing step S1022;
- step S1022: acquiring the current power margin $\Delta p$ in an adjusted main circuit;
- step S1023: acquiring the maximum power $p_{max}$ of the household appliance to be run;
- step S1024: judging whether the current power margin $\Delta p$ is greater than the maximum power $p_{max}$;
- if the current power margin $\Delta p$ is greater than the maximum power $p_{max}$, executing step S1025, and otherwise, returning to step S1025;
- and step S1025: allowing the socket into which the household appliance to be run is accessed to supply power to the household appliance to be run.

In the situation where the priority of the household appliance to be run is at the lowest level, the following steps are carried out:
- step S1026: not adjusting the running states of all currently running household appliances, and executing step S1027;
- step S1027: judging whether the household appliance to be run has a low-power running mode or not;
- if the household appliance to be run has a low-power running mode, executing step S1028, and otherwise, executing step S1032;

step S1028: acquiring the current power margin Δp of the main circuit which is not adjusted;

step S1029: acquiring the minimum power $p_{min}$ of the household appliance to be run;

step S1030: judging whether the current power margin Δp is greater than the minimum power $p_{min}$, and if the current power margin Δp is greater than the minimum power $p_{min}$, executing step S1031, and otherwise, executing step S1032;

step S1031: allowing the socket into which the household appliance to be run is accessed to supply power to the household appliance to be run in a low-power running mode;

and step S1032: refusing the socket into which the household appliance to be run is accessed to supply power to the household appliance to be run.

It will be appreciated by those skilled in the art that although the above-mentioned implementation modes have been described in connection with the case where the plug is arranged separately from the household appliance, this is not intended to be limiting, and that the form in which the plug is arranged may be arranged according to practical usage requirements without departing from the basic principles of the present invention. For example, the plug may also be arranged integrally with a household appliance having a high frequency of usage. Changes in the form of the above-mentioned arrangement do not depart from the spirit and scope of the present invention.

In summary, the control method disclosed by the invention can realize the setting of the priority sequence of the currently running household appliance through the smart plug, judge whether the household appliance to be run can be accessed into a socket of the plug in conjunction with the priority sequence of the household appliance to be run, coordinate the overall running state of all household appliances capable of being accessed into the smart plug, and meet the practical usage requirements of users on the premise of ensuring the absolute safety of the circuit environment. Even if a smart home system is not set in a user's home to associate each household appliance, the association of a plurality of household appliances can be realized through the smart plug, so that through the smart plug, the overall systematic running of the plurality of household appliances can be realized, and one local home system with running priority is associated and formed, making it convenient to use.

The technical solution of the present invention has thus far been described in connection with the preferred implementation modes shown in the accompanying drawings, but it will be readily understood by those skilled in the art that the scope of the present invention is obviously not limited to these specific implementation modes. Those skilled in the art can make equivalent alterations or substitutions to the relevant technical features without departing from the principles of the present invention, and the technical solution after such alterations or substitutions are intended to fall within the scope of the present invention.

What is claimed is:

1. A method for controlling a smart plug of a home system, wherein the home system comprises the smart plug and a plurality of household appliances, wherein the smart plug has a plurality of sockets with different priorities, and each of the sockets can access one household appliance and supply power to the household appliance; and the smart plug is programmed to implement the control method comprising:

acquiring conditions of all currently running household appliances accessing the sockets, wherein the conditions of all currently running household appliances accessing the sockets are positions of the sockets into which each currently running household appliance is accessed;

setting a priority sequence of all the currently running household appliances according to the conditions of all the currently running household appliances accessing the sockets;

judging whether a household appliance to be run is accessed into the socket;

acquiring a remaining running duration of each currently running household appliance in response to the household appliance to be run being accessed into the socket;

acquiring a shortest remaining running duration of all the remaining running durations;

comparing the shortest remaining running duration with a preset duration;

acquiring conditions of the household appliance to be run accessing the socket in response to the shortest remaining running duration being longer than the preset duration, wherein the condition of the household appliance to be run accessing the socket is a position of the socket into which the household appliance to be run is accessed;

determining a priority of the household appliance to be run according to acquired condition of the household appliance to be run accessing the socket;

determining a position of the priority of the household appliance to be run in the priority sequence; and coordinating a running state between all the currently running household appliances and the household appliance to be run by selectively adjusting the running state of the currently running household appliance according to the position of the priority of the household appliance to be run in the priority sequence.

2. The control method according to claim 1, wherein the step of selectively adjusting the running state of the currently running household appliance according to the position of the priority of the household appliance to be run in the priority sequence comprises:

when the priority of the household appliance to be run is at a highest level, adjusting the running state of the currently running household appliance according to the priority sequence.

3. The control method according to claim 2, wherein the control method further comprises, at the same time as or after the step of selectively adjusting the running state of the currently running household appliance according to the priority sequence:

acquiring a current power margin, wherein the current power margin is a difference value between a total power defined in a main circuit and a total amount of power occupied by all the currently running household appliances, wherein the main circuit is all the power supply circuits accessed with the smart plug;

acquiring a maximum power of the household appliance to be run;

comparing the current power margin with the maximum power; and if the current power margin is greater than the maximum power, allowing the socket into which the household appliance to be run is accessed to supply power to the household appliance to be run.

4. The control method according to claim 1, wherein the step of selectively adjusting the running state of the currently running household appliance according to the position of the priority of the household appliance to be run in the priority sequence comprises:

when the priority of the household appliance to be run is at a middle level, adjusting the running state of the currently running household appliance with a priority lower than that of the household appliance to be run according to the priority sequence.

5. The control method according to claim 4, wherein the control method further comprises, at the same time as or after the step of adjusting the running state of the currently running household appliance with a priority lower than that of the household appliance to be run according to the priority sequence:

acquiring a current power margin, wherein the current power margin is a difference value between a total power defined in a main circuit and a total amount of power occupied by all the currently running household appliances, wherein the main circuit is all the power supply circuits accessed with the smart plug;

acquiring a maximum power of the household appliance to be run;

comparing the current power margin with the maximum power; and if the current power margin is greater than the maximum power, allowing the socket into which the household appliance to be run is accessed to supply power to the household appliance to be run.

6. The control method according to claim 1, wherein a step of selectively adjusting the running state of the currently running household appliance according to the position of the priority of the household appliance to be run in the priority sequence comprises:

when the priority of the household appliance to be run is at a lowest level, not adjusting the running states of all the currently running household appliances.

7. The control method according to claim 6, wherein the control method further comprises, at the same time as or after the step of not adjusting the running states of all the currently running household appliances:

judging whether the household appliance to be run has a low-power running mode or not;

and if the household appliance to be run has a low-power running mode, selectively allowing the socket into which the household appliance to be run is accessed to supply power to the household appliance to be run in the low-power running mode.

8. The control method according to claim 7, wherein the step of selectively allowing the socket into which the household appliance to be run is accessed to supply power to the household appliance to be run in the low-power running mode comprises:

acquiring a current power margin, wherein the current power margin is a difference value between a total power defined in a main circuit and a total amount of power occupied by all the currently running household appliances, wherein the main circuit is all the power supply circuits accessed with the smart plug;

acquiring a minimum power of the household appliance to be run;

comparing the current power margin with the minimum power; and if the current power margin is greater than the minimum power, allowing the socket into which the household appliance to be run is accessed to supply power to the household appliance to be run in the low-power running mode.

9. The control method according to claim 8, wherein the step of selectively allowing the socket into which the household appliance to be run is accessed to supply power to the household appliance to be run in the low-power running mode further comprises:

if the current power margin is less than or equal to the minimum power, refusing the socket into which the household appliance to be run is accessed to supply power to the household appliance to be run.

10. A smart plug, wherein the smart plug has a plurality of sockets with different priorities, and each of the sockets can access one household appliance and supply power to the household appliance, and wherein the smart plug is programmed to implement the method according to claim 1.

11. A home system comprising a smart plug according to claim 10 and a plurality of household appliances.

* * * * *